United States Patent [19]

Hattori

[11] Patent Number: 5,057,851
[45] Date of Patent: Oct. 15, 1991

[54] METHOD OF EXPOSING PHOTOSENSITIVE MEDIUM FOR OPTIMUM DENSITY OF REPRODUCED IMAGE

[75] Inventor: Yutaka Hattori, Nagoya, Japan

[73] Assignee: Brother Kogyo Kabushiki Kaisha, Aichi, Japan

[21] Appl. No.: 458,508

[22] Filed: Dec. 28, 1989

[30] Foreign Application Priority Data

Jan. 13, 1989 [JP] Japan ................................. 1-6588

[51] Int. Cl.⁵ ............................................. H04N 1/21
[52] U.S. Cl. .................................... 346/1.1; 346/108; 358/298
[58] Field of Search ................. 346/108, 107 R, 76 L, 346/160, 1.1; 358/296, 298, 300, 302

[56] References Cited

U.S. PATENT DOCUMENTS 4,283,631 8/1981 Turner ............................ 250/492 B
4,950,069 8/1990 Hutchinson ....................... 351/210

Primary Examiner—Mark J. Reinhart
Attorney, Agent, or Firm—Oliff & Berridge

[57] ABSTRACT

Method and apparatus for imagewise exposing a photosensitive medium to a laser radiation according to image signals representative of nominal densities of original images, such that the medium is scanned in mutually perpendicular first and second directions at respective first and second scanning intervals. An intensity of a laser beam assigned to expose a given local spot on the photosensitive medium, which local spot has a size equal to the second scanning interval, is determined depending upon at least one of intensities of laser beams assigned to expose two local spots which are adjacent to the given local spot in the second direction, so that an average density of an image reproduced by exposure of the given local spot to the laser beam substantially coincides with the nominal density of the corresponding original image represented by the corresponding image signal.

11 Claims, 9 Drawing Sheets

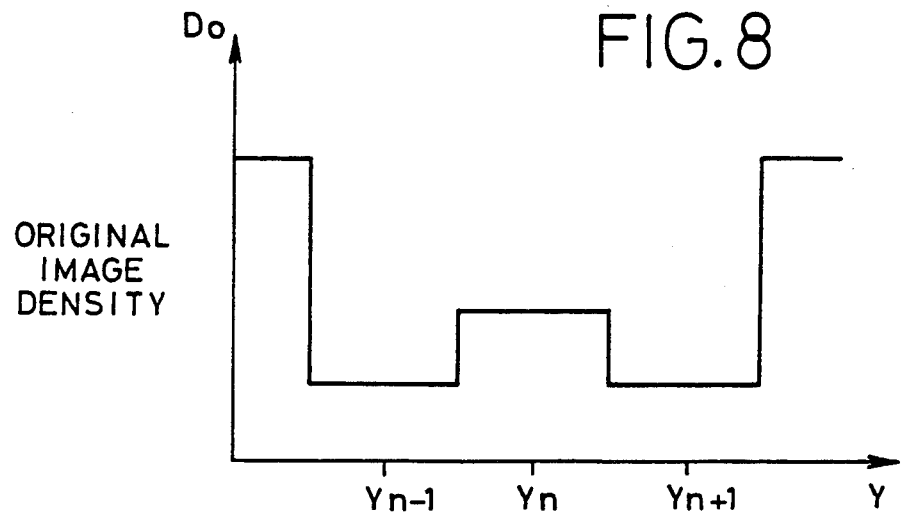
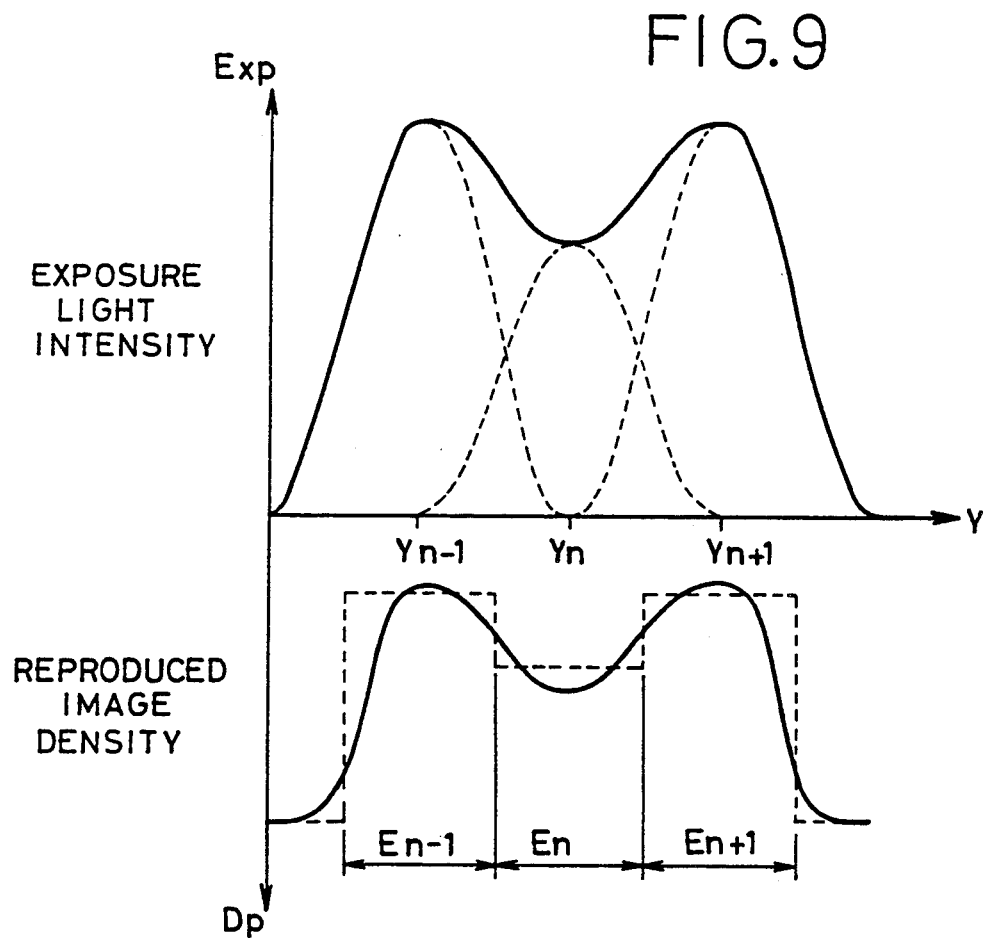

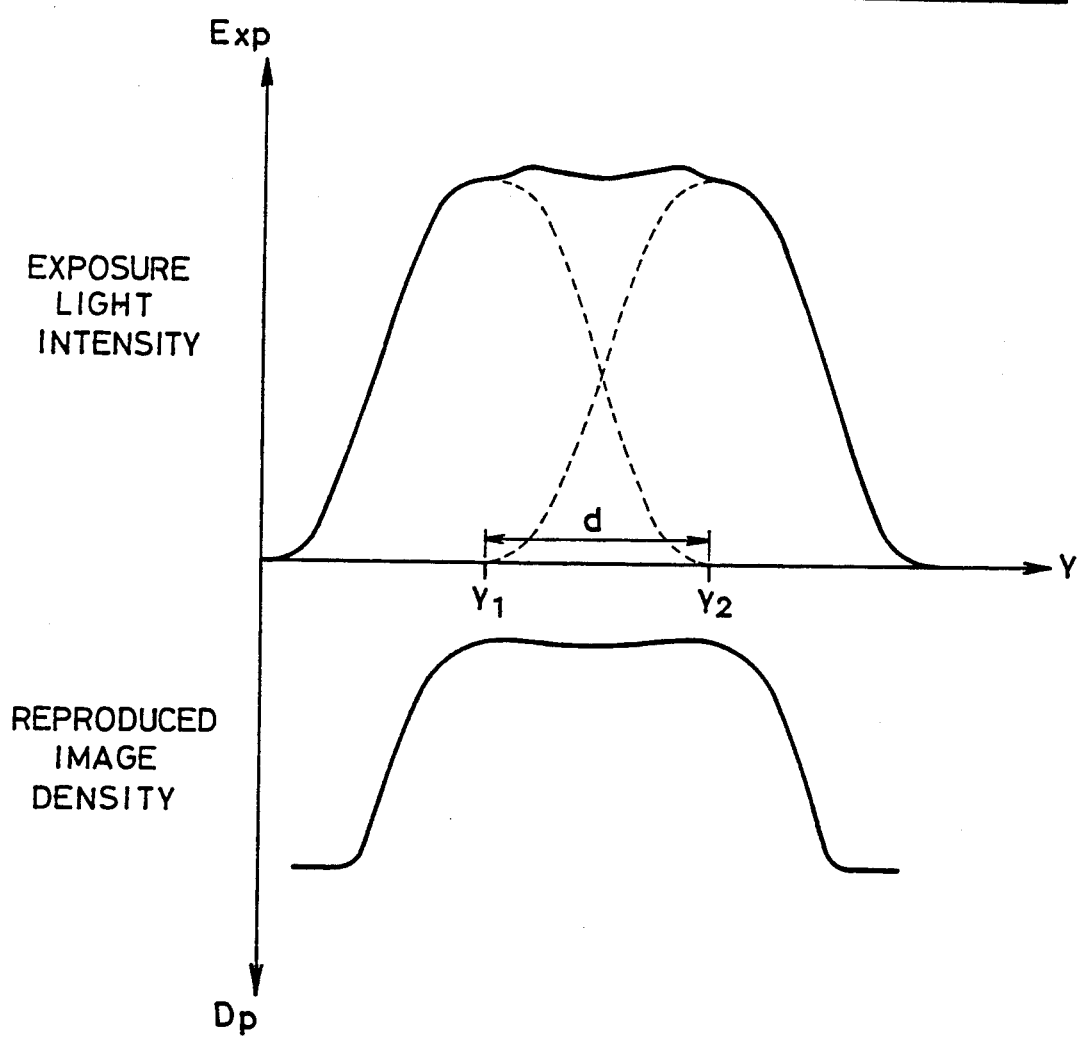

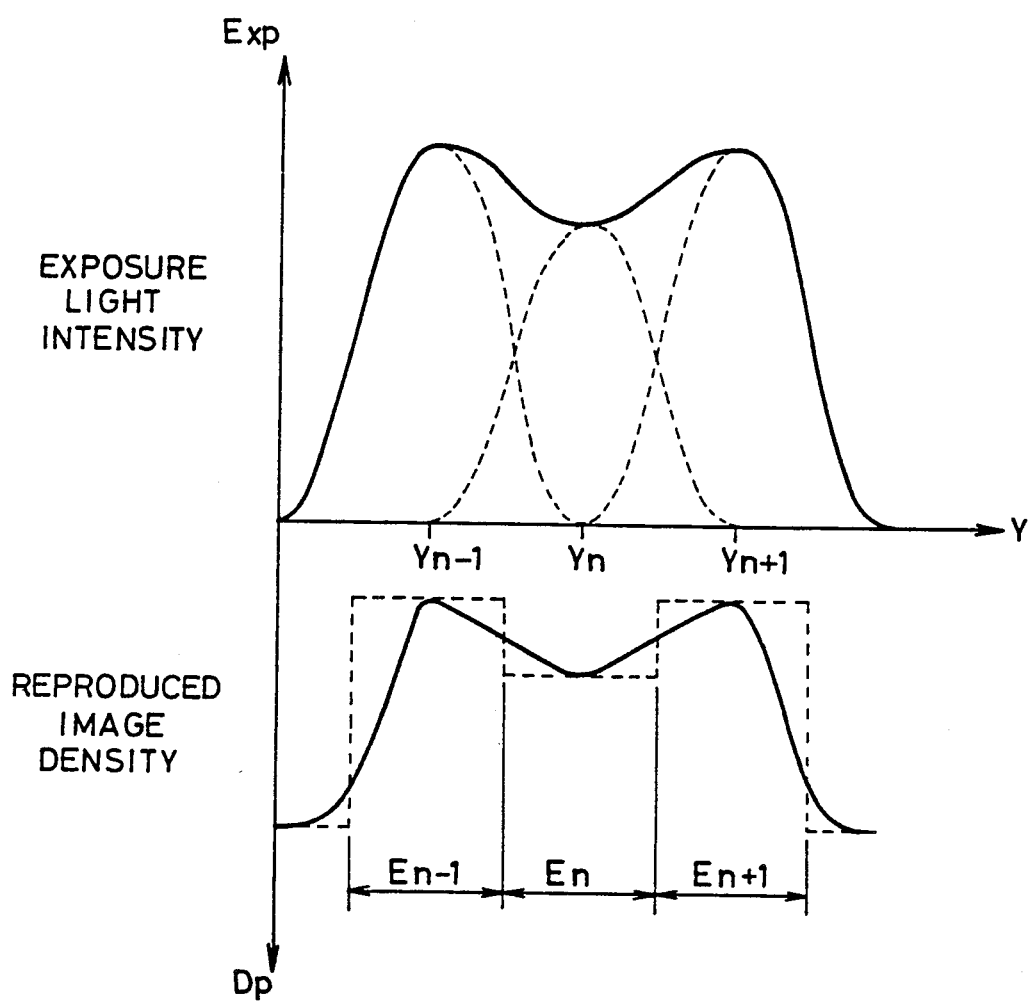

METHOD OF EXPOSING PHOTOSENSITIVE MEDIUM FOR OPTIMUM DENSITY OF REPRODUCED IMAGE

BACKGROUND OF THE INVENTION

1. Field of the Invention

The present invention relates to a method and an apparatus for exposing a photosensitive medium to laser beams having source image information representative of images to be reproduced. More particularly, the present invention is concerned with a method of controlling the intensity of the laser beams for obtaining an ideal density of reproduced images which is similar to a nominal density represented by the source image information, and a laser printer which is suitably adapted to practice the method.

2. Discussion of the Prior Art

An apparatus for imagewise exposing a photosensitive medium to a laser radiation is used in a laser printer, for example, for reproducing original images. Local spots on the photosensitive medium are irradiated by laser beams, which are controlled according to optical image signals supplied from a suitable device such as an image reader, such that the intensity of the laser beams is varied continuously or in steps so that the density of reproduced images coincides with a nominal or ideal density represented by the image signals, i.e., the density of the original images. To expose the photosensitive medium to the thus controlled laser beams, the beams are deflected for scanning the photosensitive medium in an X-axis direction over a predetermined angular range corresponding to a recording width of a recording medium. Thus, the photosensitive medium is exposed at its local spots along a line in the X-axis direction. Each time a scanning of the photosensitive medium by the laser beams in the X-axis direction is completed, the photosensitive medium is displaced in a Y-axis direction perpendicular to the X-axis direction, by a suitable distance to expose a next line parallel to the X-axis. Namely, the X-axis scanning lines are spaced apart from each other by a predetermined scanning interval in the Y-axis direction. Thus, the photosensitive medium is scanned in the X-axis and Y-axis directions by the laser beams controlled by the image signals, so that the original images represented by the image signals are reproduced on a suitable recording medium.

Generally, the intensity of a laser beam has a Gaussian or normal distribution, and the nominal intensity is a peak value of the Gaussian distribution. If the Y-axis laser scanning interval is excessively large, the intensity of the light exposing an area between adjacent two X-axis scanning lines is so low that the intensity of the corresponding reproduced images is higher than the nominal value. If the Y-axis laser scanning interval is excessively small, on the other hand, the intensity of the light exposing the area between the adjacent two X-axis scanning lines is so high that the intensity of the reproduced images is lower than the nominal value. To avoid this inconsistency between the densities of the reproduced images and the original images, the Y-axis scanning interval is determined to be almost equal to a half-width of the Gaussian distribution of the laser beam, so that the intensity of the light between the adjacent two X-axis scanning lines is almost equal to that on the X-axis scanning lines, provided that the intensity of the laser beams on one of the adjacent two X-axis scanning lines is almost equal to that on the other of the two X-axis scanning lines, namely, provided that the density of the original images is substantially constant in the Y-axis direction.

The graphs in FIG. 10 show a distribution of light intensity Exp in the Y-axis direction and a distribution of density Dp of a reproduced image, where the adjacent two laser beams have the same intensity at respective positions Y1 and Y2 in the Y-axis direction, which positions are spaced apart from each other by the Y-axis scanning interval "d", which is equal to the half-width of the Gaussian distribution. It will be understood from the graphs that the light intensity and the reproduced image density at an intermediate position between the scanning positions Y1 and Y2 are substantially equal to those at the scanning positions Y1 and Y2.

However, when the density of the original images varies in the Y-axis direction, the density or tone gradation of the reproduced images tends to be different from that of the original images represented by the image signals.

Described more particularly by reference to FIG. 11 which shows a cyclic variation in the density Do of original images in the Y-axis direction, an image reader which is adapted to read the original images produces image signals, and a photosensitive medium is imagewise exposed to laser beams controlled by the image signals, according to a known method of light exposure. The density Dp of the reproduced images is indicated in solid line in FIG. 12, while the nominal density Do of the original images is indicated in broken line in the same figure. As indicated in FIG. 12, the highest and lowest density levels of the images reproduced according to the known exposure method are lower and higher than those of the nominal density represented by the image signals. That is, the amount of variation in the density Dp is smaller than the amount of variation in the nominal density Do. This phenomenon occurs for the following reason.

Where the density Do of the original images varies in steps in the Y-axis direction as indicated in FIG. 6 such that the density at a position $Y_n$ is lower than those at adjacent positions $Y_{n-1}$ and $Y_{n+1}$, the intensity Exp of the exposure light and the density Dp of the reproduced images are as shown in FIG. 13. Namely, the average density Dp in a local spot En exposed by the intermediate laser beam at the central position $Y_n$ is higher than the nominal or ideal value indicated in broken line. On the other hand, where the density Do of the original images varies in steps as indicated in FIG. 8 such that the density at the central position $Y_n$ is higher than those at the adjacent positions $Y_{n-1}$ and $Y_{n+1}$, the intensity Exp of the exposure light and the density Dp of the reproduced images are as shown in FIG. 14. Namely, the average density Dp in the local spot En is lower than the nominal or ideal value indicated in broken line. It is noted that in FIGS. 13 and 14, the density Dp increases in the downward direction.

The nominal or ideal value Do of density of the original images indicated above corresponds to the density represented by the image signals, which is indicated in broken line in the graphs of the reproduced image density Dp in FIGS. 13 and 14. In the case of FIG. 8, the density Do at positions that are adjacent to the positions $Y_{n-1}$ and $Y_{n+1}$ and remote from the central position $Y_n$ is higher than that at the central position $Y_n$. In this case, the average densities Dp of the reproduced images in the local spots $E_{n-1}$ and $E_{n+1}$ are higher than the nominal values, whereby the densities Dp of the reproduced images at the positions $Y_{n-1}$, $Y_n$ and $Y_{n+1}$ are made closer to each other, as indicated in FIG. 9.

SUMMARY OF THE INVENTION

It is therefore an object of the present invention to provide a method of exposing a photosensitive medium to laser beams controlled according to image signals representative of original images, so that a density gradation of reproduced images in the Y-axis scanning direction is substantially equal to a nominal density gradation represented by the image signals.

A second object of the invention is to provide a laser printer which is suitable to practice the method of the invention.

The first object may be achieved according to one aspect of the present invention, which provides a method of imagewise exposing a photosensitive medium to a laser radiation according to image signals representative of nominal densities of original images to be reproduced, such that the photosensitive medium is scanned by the laser radiation in a first direction at a first scanning interval by deflecting the laser radiation over a predetermined angular range, and in a second direction perpendicular to the first direction at a second scanning interval, the method comprising the steps of: receiving the image signals representative of the nominal densities of the original images; and determining an intensity of a laser beam assigned to expose a given local spot on the photosensitive medium, which local spot has a size equal to the second scanning interval, depending upon at least one of intensities of laser beams assigned to expose two local spots which are adjacent to the given local spot in the second direction, so that an average density of an image reproduced by exposure of the given local spot to the laser beam substantially coincides with the nominal density of the corresponding original image represented by the corresponding image signal.

The second object may be achieved according to another aspect of the present invention, which provides a laser printer for reproducing original images, wherein a photosensitive medium is imagewise exposed to a laser radiation according to image signals representative of nominal densities of the original images, such that the photosensitive medium is scanned by the laser radiation in a first direction at a first scanning interval by deflecting the laser radiation over a predetermined angular range, and in a second direction perpendicular to the first direction at a second scanning interval, the laser printer comprising: (a) a laser source for producing the laser radiation; (b) first scanning means including a beam deflector for deflecting the laser radiation over a predetermined angular range, for scanning the photosensitive medium by the laser radiation in the first direction; (c) second scanning means for scanning the photosensitive medium by the laser radiation in the second direction; and (d) control means for controlling the laser source, and the first and second scanning means. The control means includes a beam controller adapted to determine an intensity of a laser beam assigned to expose a given local spot on the photosensitive medium, which local spot has a size equal to the second scanning interval, depending upon at least one of intensities of laser beams assigned to expose two local spots which are adjacent to the given local spot in the second direction, so that an average density of an image reproduced by exposure of the given local spot to the laser beam substantially coincides with the nominal density of the corresponding original image represented by the corresponding image signal.

In the method and the laser printer according to the present invention, the intensity of each laser beam assigned to expose a local spot on the photosensitive medium is determined depending upon the intensity or intensities of laser beams assigned to expose two local spots which are adjacent to the given local spot in the second direction, so that the original images represented by the image signals which represent the nominal images of the original images are reproduced with a tone or density gradation which is substantially the same as that of the nominal gradation represented by the image signals. If the original images are color images, the color of the reproduced images is substantially the same as the color of the original images represented by the image signals.

BRIEF DESCRIPTION OF DRAWINGS

The above and other objects, features and advantages of the present invention will be better understood by reading the following detailed description of the invention, when considered in connection with the accompanying drawings, in which:

FIG. 8 is a view indicating another example of distribution of an original image density;

FIG. 9 is a view showing a distribution of exposure light used for reproducing the original images of FIG. 8, and a distribution of a density of the reproduced images;

FIG. 10 is a view showing examples of distributions of exposure light and reproduced image density, according to a known method for light exposure to reproduce original images;

FIG. 14 is a view showing a distribution of exposure light used for reproducing the original images of FIG. 8 according to the known exposure method, and a distribution of the reproduced image density.

DETAILED DESCRIPTION OF THE INVENTION

Figure 1:
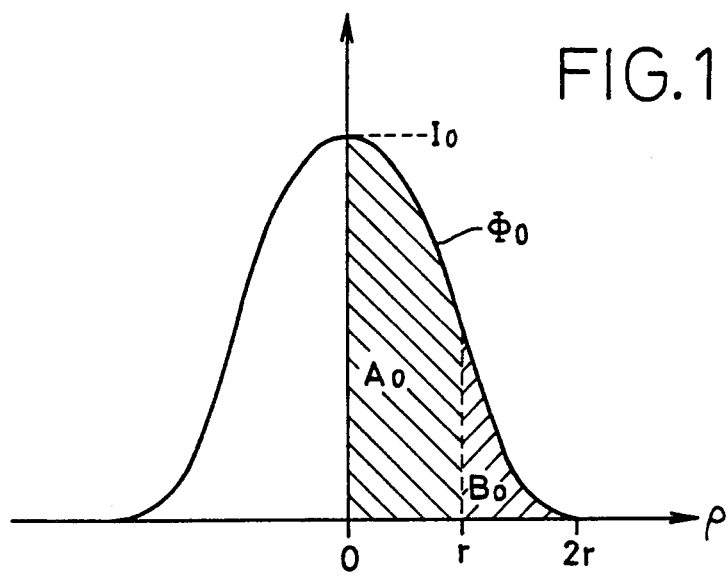
FIG. 1 is a view showing an example of distribution of intensity of a laser beam.

Referring first to FIG. 1, there is shown a Gaussian or normal distribution $\Phi_0$ of an intensity of a laser beam whose peak value is $I_0$. The intensity distribution $\Phi_0$ is represented by the following equation (1):

$$\Phi_0 = I_0 \exp(-2\rho^2/W^2) \tag{1}$$

where,
2W: Beam diameter within which the light intensity is $1/e^2$ of the peak value $I_0$ (e: natural logarithm),
$\rho$: Distance from the beam center 0 in the direction perpendicular to the optical axis.

Further, an integrated value $A_0$ of the light intensity over a range from the beam center ($\rho=0$) to a radial beam position ($\rho=r$), and an integrated value $B_0$ of the light intensity over a range from the radial beam position ($\rho=r$) to a radial beam position ($\rho=2r$), are represented by the following equations (2) and (3):

$$A_0 = \int_0^r \Phi_0 \, d\rho \tag{2}$$

$$B_0 = \int_r^{2r} \Phi_0 \, d\rho \tag{3}$$

Figure 2:
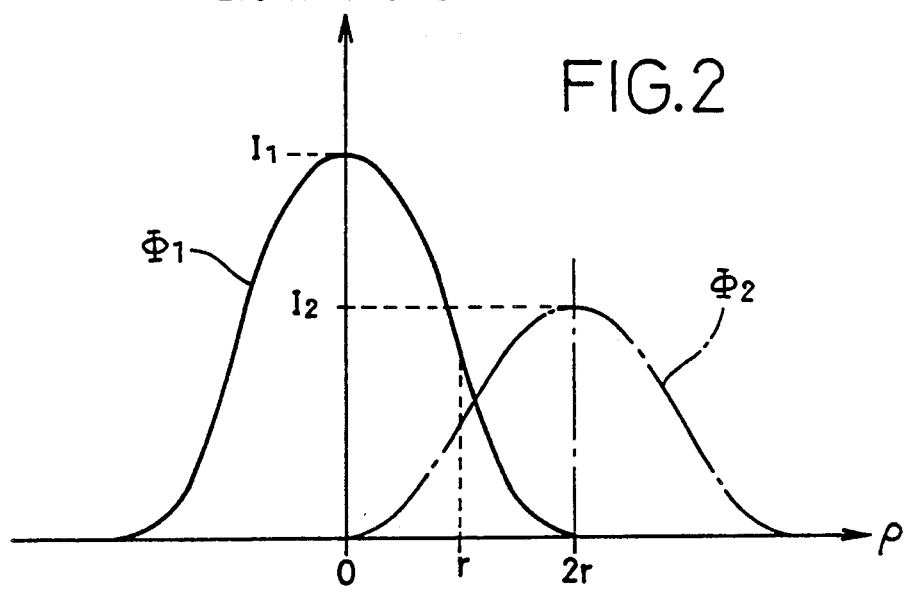
FIG. 2 is a view showing adjacent two laser beams which influence each other.

Referring to FIG. 2, there are shown the Gaussian intensity distribution $\Phi_1$ of a first laser beam (having the peak intensity value $I_1$), and a Gaussian intensity distribution $\Phi_2$ of a second laser beam (having the peak intensity value $I_2$) whose center is spaced from that of the first laser beam by a distance of 2r (Y-axis scanning interval). An integrated value $A_t$ of the light intensity over a range from the center of the first beam ($\rho=0$) to a radial position "r" ($\rho=r$ from the center of the first beam) is represented by the following equation (4):

$$A_t = \int_0^r \Phi_1 \, d\rho + \int_{-r}^{-2r} \Phi_2 \, d\rho \tag{4}$$
$$= A_1 + B_2$$

An average intensity $\bar{I}_1 r$ of the light over the range indicated just above is represented by the following equation (5):

$$\begin{aligned}I_1 r &= A_t = A_1 + B_2 \\ &= \frac{I_1}{I_0} A_0 + \frac{I_2}{I_0} B_0\end{aligned} \tag{5}$$

The following equation (6) is obtained from the equation (5):

$$I_0 \bar{I}_1 r = I_1 A_0 + I_2 B_0 \tag{6}$$

An integrated value $B_t$ of the light intensity over a range from the radial position "r" ($\rho=r$) to a radial position "2r" ($\rho=2r$) is represented by the following equation (7):

$$B_t = \int_r^{2r} \Phi_1 \, d\rho + \int_0^{-r} \Phi_2 \, d\rho \tag{7}$$
$$= B_1 + A_2$$

An average intensity $\bar{I}_2 r$ of the light over the range indicated just above is represented by the following equation (8):

$$I_0 \bar{I}_2 r = I_2 A_0 + I_1 B_0 \tag{8}$$

Where $A_0 \approx B_0$, the following equations (9) and (10) are obtained from the above equations (6) and (8):

$$I_1 = \frac{\bar{I}_1 A_0 - \bar{I}_2 B_0}{A_0^2 - B_0^2} I_0 r \tag{9}$$

$$I_2 = \frac{\bar{I}_2 A_0 - \bar{I}_1 B_0}{A_0^2 - B_0^2} I_0 r \tag{10}$$

Where $r = 0.627\,W$, $I_0 r = A_0 + B_0$, whereby the following equations (11) and (12) are obtained:

$$I_1 = (\bar{I}_1 A_0 - \bar{I}_2 B_0)/(A_0 - B_0) \tag{11}$$

$$I_2 = (\bar{I}_2 A_0 - \bar{I}_1 B_0)/(A_0 - B_0) \tag{12}$$

Therefore, the average light intensities $\bar{I}_1$ and $\bar{I}_2$ can be determined by calculating the intensities $I_1$ and $I_2$ according to the above equations (11) and (12).

In the case discussed above by reference to FIG. 2, an appropriate local area of a photosensitive medium is exposed by adjacent two laser beams (first and second beams) one after the other, such that the centers of the beams are spaced apart from each other by the distance equal to 2r. In an actual exposing operation as in a laser printer, the light intensities at three successive positions in the Y-axis direction should be considered. Namely, it is necessary to consider a nominal light intensity $I_n$ at a given central or intermediate position, and nominal light intensities $I_{n-1}$ and $I_{n+1}$ at two positions between which the relevant intermediate position is located. The nominal light intensities $I_n$, $I_{n-1}$ and $I_{n+1}$ are represented by the appropriate image signals. An optimum light intensity $I_{n*}$ at a given position which gives the nominal density of the original image represented by the image signal is calculated from the following equation (13), based on the nominal light intensities $I_n$, $I_{n-1}$, $I_{n+1}$, so that the average density of the reproduced image in a local spot at the given position substantially coincides with the nominal density of the corresponding original image. The values $I_n$, $I_{n-1}$, $I_{n+1}$ and $I_{n*}$ are peak intensity values at the centers of the respective laser beams.

$$I_{n*} = \frac{2I_n A_0 - (I_{n-1} + I_{n+1})B_0}{2(A_0 - B_0)} \tag{13}$$

The above equation (13) is satisfied where each laser beam has the Gaussian distribution, and the above-identified distance r is equal to 0.627 W while the Y-axis scanning interval 2r is equal to 1.254 W. The distance r of 1.627 W is almost equal to 0.589 W, which is ½ of the half-width of the Gaussian distribution of the laser beam, i.e., equal to a radial distance from the beam center at which the intensity is a half of the peak value $I_0$. Therefore, the Y-axis scanning interval 2r is almost equal to the half-width of the Gaussian distribution of the laser beam intensity.

While the foregoing description refers to the laser radiation having the Gaussian distribution of intensity, the principle of the present invention is equally applicable to a laser radiation having other intensity distribution. Qualitatively, the principle of the invention lies in that the intensity of a laser beam at the relevant Y-axis scanning position is reduced where it is lower than those at the adjacent positions, while on the other hand the intensity at the relevant position is increased where it is higher than those at the adjacent positions.

Although the Y-axis scanning interval of the laser beams should be set almost equal to the half-width of the Gaussian distribution of intensity if the above-indicated equation (13) is used to calculate the light intensity, the scanning interval may be determined otherwise, provided that the intensity distributions of the adjacent laser beams are partially superimposed on each other, as indicated in FIG. 2.

The above-indicated equation (13) is adapted to regulate the light intensity at the relevant Y-axis scanning position, with the intensities at the adjacent two positions taken into consideration. However, the equation or the manner of regulating the intensity may be suitably modified, for example, so as to calculate the intensity at the relevant scanning position, based on the already regulated intensity at the preceding scanning position.

Further, the equation (13) to determine the light intensity $I_{n*}$ may be replaced by a predetermined suitable relationship represented by a curve, for example, which includes variables such as $I_n$, $I_{n-1}$ and $I_{n+1}$.

The adjustment of the light intensity according to the present invention is not necessarily effected over the entire range of scanning in the Y-axis direction, but may be effected over limited areas in which the density of the original image greatly varies in the Y-axis direction.

Figure 3:
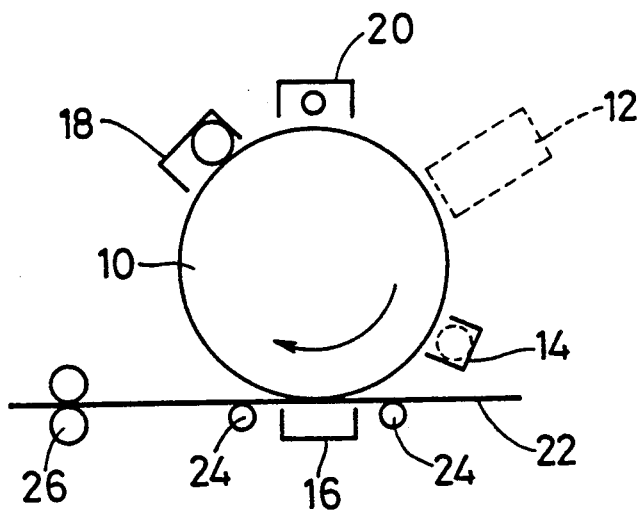
FIG. 3 is a schematic view illustrating an example of a laser printer wherein a photosensitive drum is imagewise exposed to laser beams according to the invention.

Referring next to the schematic view of FIG. 3, there is shown a laser printer which has a photosensitive drum 10 adapted to rotate in one direction as indicated by arrow. Around the circumference of this photosensitive drum 10, there are disposed a light deflector 12 for producing a laser beam to imagewise expose the surface of the drum, a developing device 14 for applying a toner to the drum surface, a toner transferring device 16 for transferring the toner to a recording medium 22, a cleaning device 18 and an electrostatically charging device (corona charger) 20. The recording medium 22 is fed between the drum 10 and the toner transferring device 16, while being guided by guide rollers 24, such that the recording surface of the medium 22 is in contact with the surface of the drum 10. The medium 22 is further fed to pass an image fixing device 26.

The photosensitive drum 10 is principally constituted by an electrically conductive support structure, a photoconductive layer serving as a photosensitive medium, and an electrically insulating layer, as well known in the art. In operation of the laser printer, the toner possibly remaining on the outer circumferential photosensitive surface of the drum 10 is removed by the cleaning device 18. The cleaned surface of the drum 10 is then electrostatically charged either positively or negatively by the charging device 20. The thus uniformly electrostatically charged surface of the drum 10 is imagewise exposed to laser beams which are produced by the light deflector 12. The laser beams are assigned to expose respective local spots on the drum 10 and are deflected over a predetermined angular range in the X-axis direction parallel to the axis of rotation of the drum 10. As the beams are deflected along a line parallel to the X-axis, the amount of the light irradiating the local spots along the line is changed according to image signals applied to the light deflector 12. With the drum 10 rotated, the drum surface is scanned in the Y-axis direction perpendicular to the axis of rotation of the drum. As a result, there is developed an electrostatic pattern of latent images due to differences in electrostatic potential between the exposed and non-exposed local spots (more precisely, between the spots exposed by the varying amounts of light, which may be zero). The electrostatically imagewise exposed surface of the drum 14 is then subjected to a developing operation by the developing device 14, such that the toner is applied to the drum surface, as visible images corresponding to the electrostatic latent images, as well known in the art.

The toner is transferred by the transferring device 16 onto the surface of the recording medium 22, and the transferred toner images are fixed by the fixing device 26. Thus, the electrostatic latent images formed on the photosensitive drum 10 by the laser beam are developed into the visible toner images formed on the recording medium 22.

The light deflector 12 consists of a solid deflector element 28 including a light-transparent substrate, and a semiconductor laser element 30 formed on one of opposite end faces of the substrate. The deflector element 28 has a waveguide formed on the substrate. A laser beam produced by the laser element 30 is guided through the waveguide. The deflector element 28 includes a light deflecting portion for deflecting the laser beam by an acousto-optical or electro-optical effect, and a light converging portion for focusing the laser beam on the surface of the photosensitive drum 10. The acousto-optical effect is a phenomenon in which a light beam passing through an acoustic wave is deflected due to diffraction of the beam by periodic change in the refractive index, and the electro-optical effect is a phenomenon in which a light beam passing through an electro-optical crystal is deflected due to a local change in the refractive index of the crystal when the crystal is placed in an electric field.

A deflector controller 32 in the form of a computer is provided to control the frequency of deflection of the laser beams by the solid deflector element 28, and to control the switching of the laser element 30 to selectively irradiate the local spots on the surface of the photosensitive drum 10 as the laser beams are deflected along a line in the X-axis direction. The deflector controller 32 also controls the intensity of the laser beams generated by the element 30. To control the switching operation of the laser element 28 and the intensity of each laser beam assigned to irradiate a specific local spot on the drum 10, the deflector controller 32 receives image signals representative of original images (consisting of characters or graphical figures, for example) to be reproduced. Thus, the original images represented by the image signals are reproduced as the electrostatic latent images on the surface of the drum 10, and as the visible toner image on the recording medium 22, such that the density of the reproduced visible images varies depending upon the controlled intensities of the laser beams represented by the image signals.

Each laser beam assigned to expose or irradiate a local spot on the photosensitive medium 10 has a Gaussian or normal distribution of intensity. The scanning interval in the Y-axis direction is regulated by the rotating speed of the drum 10 while the scanning interval in the X-axis direction (in the beam deflecting direction) is regulated by the rate at which the laser beam is deflected by the deflector element 28. The scanning intervals in the Y-axis and X-axis directions are both determined to be equal to the half-width of the Gaussian distribution of intensity, more specifically, equal to 1.254 W, where the beam diameter is 2 W within which the intensity is $1/e^2$ of the peak intensity, as previously explained. The intensity $I_{n*}$ of each laser beam is determined by the deflector controller 32, according to the equation (13), based on the nominal light intensities $I_n$, $I_{n-1}$ and $I_{n+1}$ which are represented by the respective image signals, such that the intensities of the laser beams adjacent to the relevant laser beam in the Y-axis direction are taken into consideration, so that the average intensity in the local spot exposed by each laser beam coincides with an optimum value.

Figure 5:
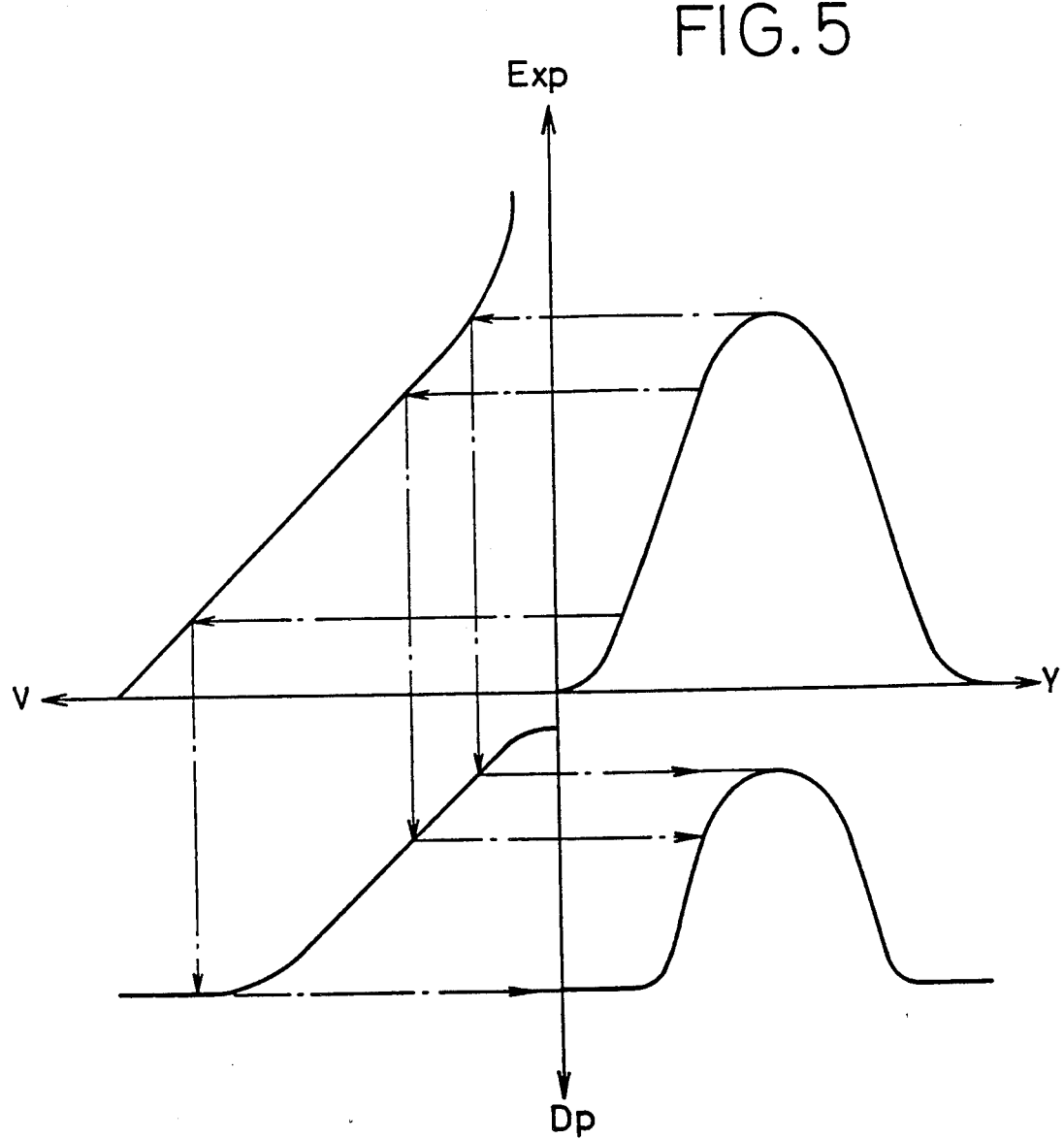
FIG. 5 is a graph showing an example of nominal sensitometry of the photosensitive drum of the printer.

While the density of the reproduced images changes with the intensity of the corresponding laser beams, the relationship between the amounts of change in the light intensity and the image density varies depending upon the specific sensitometry of the photosensitive medium, i.e., photosensitive drum 10. In view of this, the intensity of the laser beams is determined with the sensitometry of the drum 10 taken into account, so that the density of the reproduced images coincides with the nominal density represented by the image signals. An example of the sensitometry of the photosensitive drum 10 is illustrated in the graph of FIG. 5, wherein the first quadrant indicates a distribution of an intensity Exp of an exposure laser beam, while the fourth quadrant indicates a distribution of a density Dp of the reproduced images. The density distribution is influenced by a light attenuation characteristic indicated in the second quadrant, and a density characteristic of the toner transferred to the recording medium 22, indicated in the third quadrant. Namely, the light attenuation characteristic and the toner density characteristic are taken into account in determining the intensity of each laser beam according to the equation (13).

Figure 6:
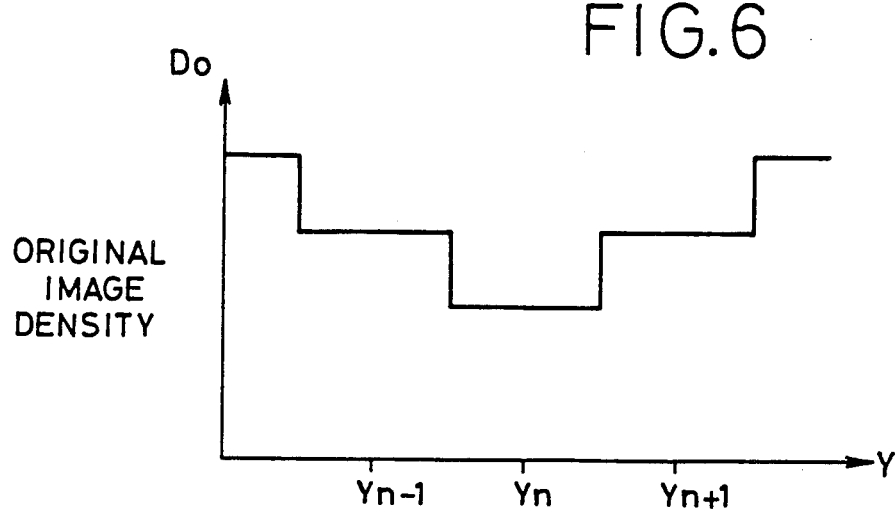
FIG. 6 is a view indicating an example of distribution of a density of original images.
Figure 7:
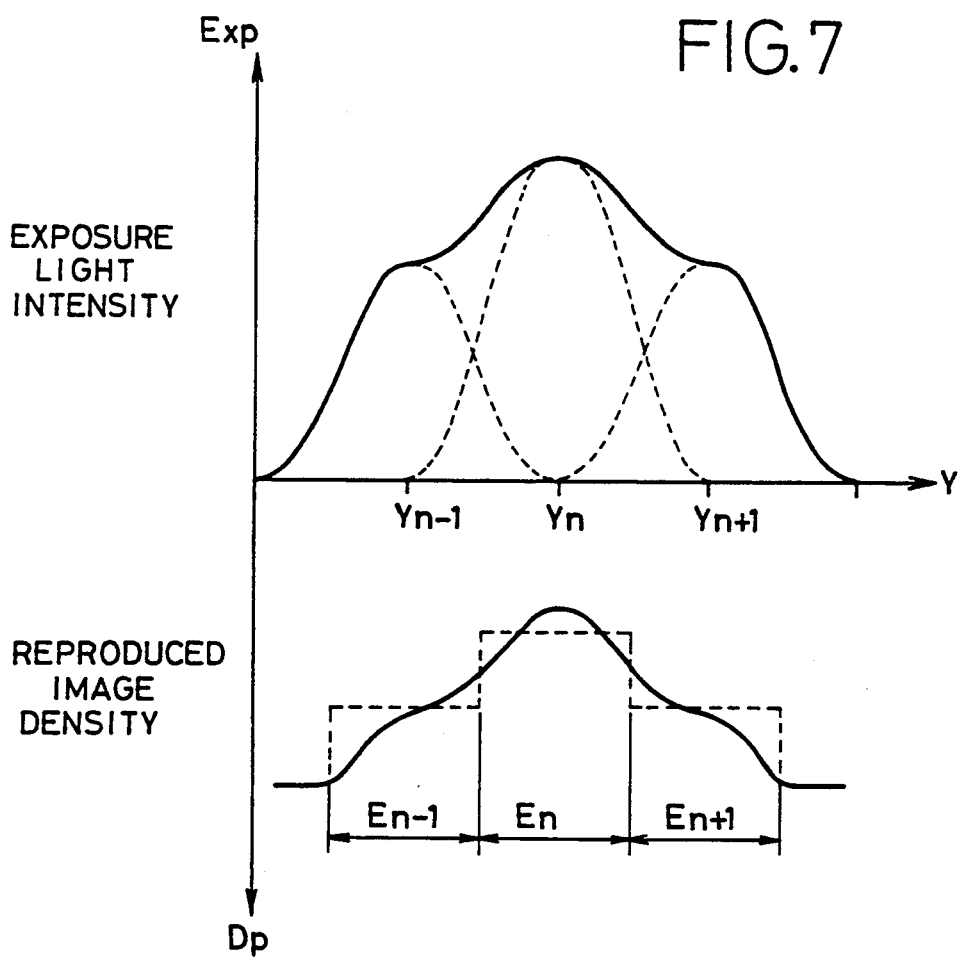
FIG. 7 is a view showing a distribution of exposure light used for reproducing the original images of FIG. 6 by the laser printer of FIG. 3, and a distribution of a density of the reproduced images.
Figure 11:
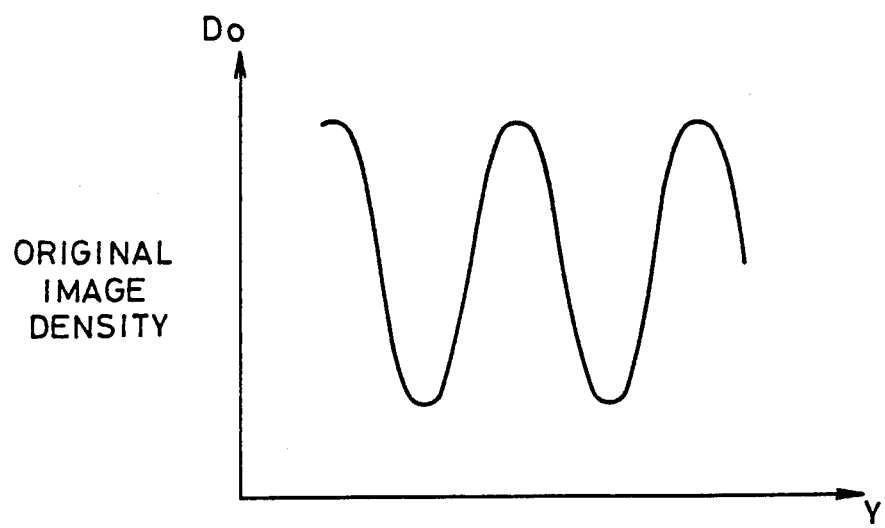
FIG. 11 is a view illustrating another example of distribution of an original image density.
Figure 12:
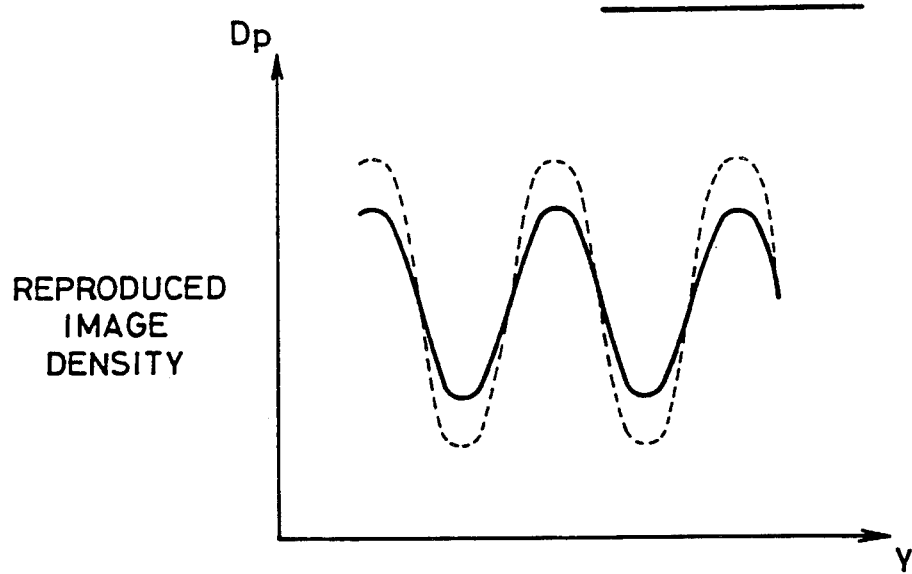
FIG. 12 is a view showing a distribution of density of images reproduced from the original images of FIG. 11, according to a known exposure method.
Figure 13:
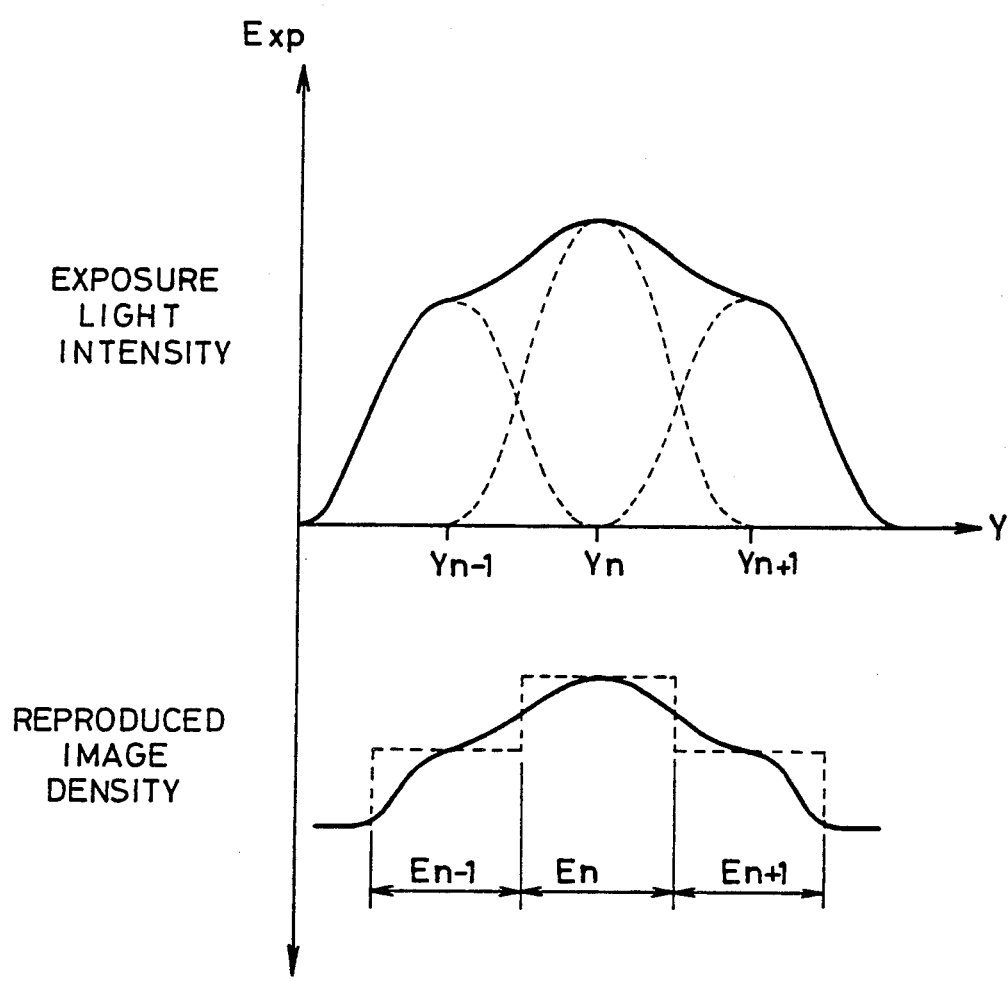
FIG. 13 is a view showing a distribution of exposure light used for reproducing the original images of FIG. 6 according to the known exposure method, and a distribution of the reproduced image density.

In the thus constructed laser printer, the original images having the density distribution as indicated in FIG. 6 are reproduced on the recording medium 22 as the visible images having a distribution of a density Dp in the Y-axis direction as indicated in FIG. 7, by exposing the photosensitive drum 10 to laser beams which have a distribution of an intensity Exp as indicated in FIG. 7, which is determined by the deflector controller 32 according to the image signals from an image reader and the equation (13) indicated above. It will be understood that the average density of the reproduced image in a local spot En corresponding to the Y-axis scanning position $Y_n$ is almost equal to the optimum value as indicated in broken line in FIG. 7. When the image signals representative of the original images having the density distribution as shown in FIG. 8 are received by the deflector controller 32, the intensity Exp of the laser beams is determined as indicated in FIG. 9, whereby the reproduced images have the density distribution as indicated in FIG. 9. In this case, too, the average density of the reproduced image in the local spot En is almost equal to the optimum value as indicated in broken line in FIG. 9. Thus, the present laser printer is capable of reproducing the original images having a density variation in the Y-axis direction, such that the reproduced images have a density or tone gradation almost equal to the nominal density gradation of the original images as represented by the image signals. If a color printing is effected on the present laser printer, the reproduced color is similar to the color of the original images.

Figure 4:
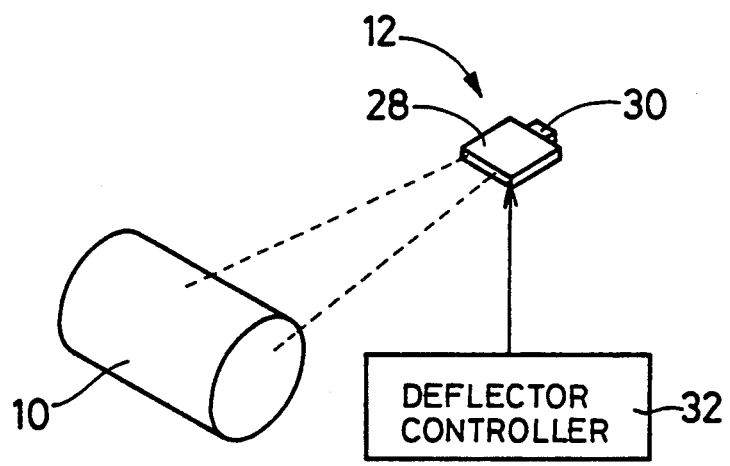
FIG. 4 is a fragmentary perspective view of the laser printer of FIG. 3, schematically showing a light deflector controlled by a control circuit.

While one embodiment of the present invention as applied to a laser printer has been described for illustrative purpose only, it is to be understood that the invention may be applied to any image reproducing apparatus other than the laser printer of FIGS. 3 and 4, provided that the apparatus uses laser beams for exposing a photosensitive medium. Further, the present invention may be embodied with various changes, modifications and improvements, for example, in the manner of determining the intensity of each laser beam, which may occur to those skilled in the art, without departing from the spirit and scope of the invention defined in the following claims.

What is claimed is:

1. A method of imagewise exposing a photosensitive medium to a laser radiation according to image signals representative of nominal densities of original images to be reproduced, such that the photosensitive medium is scanned by the laser radiation in a first direction at a first scanning interval by deflecting said laser radiation over a predetermined angular range, and in a second direction perpendicular to the first direction at a second scanning interval, comprising the steps of:

receiving said image signals representative of said nominal densities of the original images; and determining an intensity of a laser beam assigned to expose a given local spot on the photosensitive medium, which local spot has a size equal to said second scanning interval, depending upon at least one of intensities of laser beams assigned to expose two local spots which are adjacent to said given local spot in said second direction, so that an average density of an image reproduced by exposure of said given local spot to said laser beam substantially coincides with the nominal density of the corresponding original image represented by the corresponding image signal.

2. A method according to claim 1, wherein said intensity of said laser beam assigned to expose said given local spot is determined such that the intensity of the laser beam assigned to expose said given local spot is reduced when it is lower than said at least one of intensities of the laser beams assigned to expose said two local spots, and is increased when it is higher than said at least one of intensities.

3. A method according to claim 1, wherein the intensity of each of said laser beams assigned to expose said given local spot and said two local spots adjacent to said given local spot has a Gaussian distribution.

4. A method according to claim 2, wherein said second scanning interval is substantially equal to a half-width of said Gaussian distribution of intensity of said each laser beam.

5. A method according to claim 1, wherein said step of determining an intensity of a laser beam assigned to expose a given local spot comprising determining said intensity of the laser beam assigned to expose said given local spot, according to the following equation:

$$I_{n*} = \frac{2I_n A_0 - (I_{n-1} + I_{n+1})B_0}{2(A_0 - B_0)}$$

where, $I_{n*}$: Intensity of the laser beam assigned to expose said given local spot, $I_{n-1}$: Intensity of the laser beam assigned to expose one of said two local spots which precedes said given local spot in said second direction, $I_{n+1}$: Intensity of the laser beam assigned to expose the other of said two local spots which follows said given local spot in said second direction, $A_0$: Constant, and $B_0$: Constant.

6. A laser printer for reproducing original images, wherein a photosensitive medium is imagewise exposed to a laser radiation according to image signals representative of nominal densities of said original images, such that the photosensitive medium is scanned by the laser radiation in a first direction at a first scanning interval by deflecting said laser radiation over a predetermined angular range, and in a second direction perpendicular to the first direction at a second scanning interval, comprising:

a laser source for producing said laser radiation;

first scanning means including a beam deflector for deflecting the laser radiation over a predetermined angular range, for scanning said photosensitive medium by the laser radiation in said first direction;

second scanning means for scanning said photosensitive medium by the laser radiation in said second direction; and control means for controlling said laser source, and said first and second scanning means, said control means including a beam controller for determining an intensity of a laser beam assigned to expose a given local spot on the photosensitive medium, which local spot has a size equal to said second scanning interval, depending upon at least one of intensities of laser beams assigned to expose two local spots which are adjacent to said given local spot in said second direction, so that an average density of an image reproduced by exposure of said given local spot to said laser beam substantially coincides with the nominal density of the corresponding original image represented by the corresponding image signal.

7. A laser printer according to claim 6, wherein said beam deflector comprises a solid beam deflecting element, while said laser source comprises a semiconductor laser element provided on an end face of said solid beam deflecting element.

8. A laser printer according to claim 6, wherein said beam controller determines said intensity of said laser beam assigned to expose said given local spot such that the intensity of the laser beam assigned to expose said given local spot is reduced when it is lower than said at least one of intensities of the laser beams assigned to expose said two local spots, and is increased when it is higher than said at least one of intensities.

9. A laser printer according to claim 6, wherein the intensity of each of said laser beams assigned to expose said given local spot and said two local spots adjacent to said given local spot has a Gaussian distribution.

10. A laser printer according to claim 9, wherein said second scanning interval is substantially equal to a half-width of said Gaussian distribution of intensity of said each laser beam.

11. A laser printer according to claim 6, wherein said beam controller determines said intensity of the laser beam assigned to expose said given local spot, according to the following equation:

$$I_{n*} = \frac{2I_n A_0 - (I_{n-1} + I_{n+1})B_0}{2(A_0 - B_0)}$$

where, $I_{n*}$: Intensity of the laser beam assigned to expose said given local spot, $I_{n-1}$: Intensity of the laser beam assigned to expose one of said two local spots which precedes said given local spot in said second direction, $I_{n+1}$: Intensity of the laser beam assigned to expose the other of said two local spots which follows said given local spot in said second direction, $A_0$: Constant, and $B_0$: Constant.

* * * * *